United States Patent
Ashley et al.

(10) Patent No.: US 11,568,408 B1
(45) Date of Patent: Jan. 31, 2023

(54) APPARATUS AND METHOD FOR PROCESSING VIRTUAL CREDIT CARDS FOR DIGITAL IDENTITIES

(71) Applicant: Anonyome Labs, Inc., Salt Lake City, UT (US)

(72) Inventors: Paul Ashley, Toowong (AU); Simon Gee, Varsity Lakes (AU); Steven Harvey McCown, Mapleton, UT (US); Tim Bartley, Worongary (AU); John David Mumford, Portola Valley, CA (US)

(73) Assignee: Anonyome Labs, Inc., Salt Lake City, UT (US)

( * ) Notice: Subject to any disclaimer, the term of this patent is extended or adjusted under 35 U.S.C. 154(b) by 79 days.

(21) Appl. No.: 16/985,962

(22) Filed: Aug. 5, 2020

(51) Int. Cl.
*G06Q 20/40* (2012.01)
*G06Q 20/36* (2012.01)

(52) U.S. Cl.
CPC ..... *G06Q 20/4014* (2013.01); *G06Q 20/3678* (2013.01); *G06Q 20/405* (2013.01); *G06Q 20/4018* (2013.01)

(58) Field of Classification Search
CPC .......... G06Q 30/0209; G06Q 20/3678; G06Q 20/405; G06F 21/45
See application file for complete search history.

(56) References Cited

U.S. PATENT DOCUMENTS

| | | | | |
|---|---|---|---|---|
| 7,510,186 | B2* | 3/2009 | Fleckenstein | G07F 17/3202 273/149 R |
| 7,824,543 | B2* | 11/2010 | Larkner | C02F 1/008 222/25 |
| 8,052,519 | B2* | 11/2011 | Soltys | A63F 1/00 463/25 |
| 8,100,753 | B2* | 1/2012 | Soltys | A63F 3/00157 463/21 |
| 8,992,323 | B2* | 3/2015 | Kelly | G07F 17/3211 463/37 |
| 9,472,047 | B2* | 10/2016 | Hilbert | G07F 17/3213 |
| 9,667,427 | B2* | 5/2017 | Oberhauser | G06Q 10/06 |
| 9,749,140 | B2* | 8/2017 | Oberhauser | G11B 20/00086 |
| 9,821,221 | B2* | 11/2017 | Patton | A63F 13/2145 |
| 10,187,388 | B2* | 1/2019 | Higgins | H04L 63/10 |
| 10,764,292 | B2* | 9/2020 | Higgins | H04L 63/10 |
| 10,783,237 | B2* | 9/2020 | Chen | G06F 21/45 |
| 10,938,835 | B2* | 3/2021 | Oberhauser | H04L 9/3236 |

(Continued)

OTHER PUBLICATIONS

White, R., "How Computers Work", Millenium Edition (Sep. 1999) (Year: 1999).*

*Primary Examiner* — Daniel S Felten
(74) *Attorney, Agent, or Firm* — Cooley LLP

(57) ABSTRACT

A non-transitory computer readable storage medium has instructions executed by a processor to maintain digital identities. Each digital identity has identity attributes different than identity attributes associated with a real individual utilizing the digital identity. Each digital identity has an associated attribute for compartmentalized network activity. Interactions between the digital identities and a virtual card provider are supported to secure virtual cards for the digital identities. Interactions between the digital identities and a persona management application are brokered, including delivering the virtual cards for the digital identities to the persona management application.

4 Claims, 11 Drawing Sheets

(56) References Cited

U.S. PATENT DOCUMENTS

| | | | | |
|---|---|---|---|---|
| 11,070,543 | B2* | 7/2021 | DeWeese | H04L 63/20 |
| 11,290,429 | B1* | 3/2022 | Ashley | G06F 21/6245 |
| 2010/0082487 | A1* | 4/2010 | Nelsen | G06Q 20/351 |
| | | | | 705/44 |
| 2011/0307377 | A1* | 12/2011 | Nelsen | G06Q 20/348 |
| | | | | 705/41 |
| 2012/0069131 | A1* | 3/2012 | Abelow | G06Q 10/067 |
| | | | | 348/14.01 |
| 2013/0325681 | A1* | 12/2013 | Somashekar | H04M 15/8011 |
| | | | | 705/35 |
| 2014/0018136 | A1* | 1/2014 | Sai | G06Q 30/0209 |
| | | | | 463/11 |
| 2014/0249904 | A1* | 9/2014 | Nelsen | G06Q 30/0222 |
| | | | | 705/14.23 |
| 2014/0279454 | A1* | 9/2014 | Raman | H04L 63/102 |
| | | | | 709/227 |
| 2015/0227922 | A1* | 8/2015 | Filler | G06F 3/0486 |
| | | | | 705/41 |
| 2016/0063239 | A1* | 3/2016 | Chen | G06F 21/31 |
| | | | | 726/6 |
| 2016/0063657 | A1* | 3/2016 | Chen | H04L 63/0421 |
| | | | | 705/325 |
| 2016/0065579 | A1* | 3/2016 | Chen | H04L 63/10 |
| | | | | 726/4 |
| 2019/0141043 | A1* | 5/2019 | Higgins | H04L 63/10 |
| 2019/0207951 | A1* | 7/2019 | Oberhauser | H04L 63/126 |
| 2019/0333054 | A1* | 10/2019 | Con | G06F 21/31 |
| 2020/0366671 | A1* | 11/2020 | Larson | H04L 63/0861 |

\* cited by examiner

APPARATUS AND METHOD FOR PROCESSING VIRTUAL CREDIT CARDS FOR DIGITAL IDENTITIES

FIELD OF THE INVENTION

This invention relates generally to network communications. More particularly, this invention relates to techniques for processing virtual credit cards for digital identities.

BACKGROUND OF THE INVENTION

Credit cards have been one of the most successful innovations in finance. They allow a person to buy goods, either in person or online, without needing to manage physical cash. The merchant charges the credit card for the amount of the product and through a complex payment processing system will receive the money from the customer. Credit cards are physical, in that a bank issues a plastic card that carries the credit card identifying information.

A typical credit card has a brand, a card number, an expiry date and card verification code (CVC). It may also have other attributes, such as: billing address, geo location limits, credit limit, transaction limit, and methods for delivering transactions and notifications to the owner. A person commonly has a number of such credit cards.

Although credit cards have revolutionized the payment system, the use of credit cards has also created new risks. Two main risks include the confidential payment identifier (i.e., the credit card number) printed on the front of the card and the Card Verification Code (CVC; that protects the card number) is printed on the back. When a user presents credit card details, sensitive information is disclosed that can be easily misused. A dishonest person can steal the credit card information and then use it for unauthorized purchases. This can occur either by making a new physical card for an in-store purchase (card present transaction), or using the credit card identifying information to purchase online (card not-present transaction).

Once a person's credit card information has been stolen and used in an unauthorized way, the person owning the card has to then clean up the mess. For example, one can try to recover the stolen money from a bank, one can request a replacement card be issued by the bank, one can update any recurring billing accounts where the stolen card is registered, and so on. There is a range of financial and non-financial inconveniences to deal with.

A virtual credit card is one that has no physical embodiment, it is digital only. It still has the same identifying information associated with it such as card brand, card number, card expiry and CVC, and can therefore be used in online situations. One value of a virtual credit card over a physical plastic credit card is that it can be more easily issued and cancelled as there is no cumbersome process involved in creating a plastic card.

There are additional attributes that are commonly associated with a virtual credit card that are not normally associated with a physical credit card. A virtual card requires a funding source, which may be another credit card, debit card or direct bank deduction. The card can be locked to a merchant category or even to an individual merchant. The card can have time based restrictions, daily spending limits and so on. These additional attributes considerably reduce the risks involved for both the user and the merchant. There are a number of virtual card providers on the market that will issue such virtual cards.

Although virtual credit cards provide enhancements over physical credit cards, users find the day-to-day management of virtual credit cards too complex. With the addition of new configuration options, and the possibility of using virtual credit cards across various aspects of a person's daily life, it can become very complicated to manage the different card settings and transactions. For example, a user might want to use virtual credit cards for work and wants to limit purchasing only to office suppliers. For travel, the same user might only want to allow virtual credit card purchasing through a limited set of travel providers, such as travel consultants, specific hotels, airlines, and car rental agencies. In addition, the user might also need different daily spending limits applied in each situation. With current virtual credit cards systems these real-life situations are difficult to manage and they are error prone.

In recent years, there have been multiple efforts to improve upon the credit card system by layering various types of protections, such as cryptographic assertions and verifications. One notable example is PayPal® where a customer is redirected, during the checkout process to a personal account where a payment to a specific merchant is authorized. Upon successful identification and authorization, a customer instructs PayPal® to pay a merchant. This lets the customer keep the exposure of their actual credit card information limited to the PayPal® service, while keeping it hidden from the merchants who receive the payments. Another notable example is the use of cryptocurrencies (e.g., bitcoin). Commonly, a credit card or bank account is used to onboard funds into a crypto currency account where the user can spend them by virtue of using a series of complex cryptographic assertions and verifications. Similar to the PayPal® process, the cryptocurrency mechanisms enable customers to spend money with merchants without disclosing actual credit card information. These systems have numerous benefits. However, one main drawback is that they use different payment protocols and methods that merchants must adopt in order to receive payments.

Thus, there is a need for improved processing of virtual credit cards.

SUMMARY OF THE INVENTION

A non-transitory computer readable storage medium has instructions executed by a processor to maintain digital identities. Each digital identity has identity attributes different than identity attributes associated with a real individual utilizing the digital identity. Each digital identity has an associated attribute for compartmentalized network activity. Interactions between the digital identities and a virtual card provider are supported to secure virtual cards for the digital identities. Interactions between the digital identities and a persona management application are brokered, including delivering the virtual cards for the digital identities to the persona management application.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The disclosed technology combines user identity personas with virtual credit cards to provide a strong compartmentalized approach to both configuration and management of virtual credit cards. Personas are an approach that allows a user to map roles in the real world into the digital world by allowing the user to create a persona (digital identity) for each of many roles, such as work, home, dating, shopping, selling, travel, donations and so on.

Disclosed are techniques where the user manages and issues virtual cards under different personas so that there is compartmentalization of all aspects of the virtual card configuration, transactions, notifications and so on. The disclosed personas provide a scalable, manageable and more secure system for users that increases user convenience and substantially reduces fraud.

Figure 1:
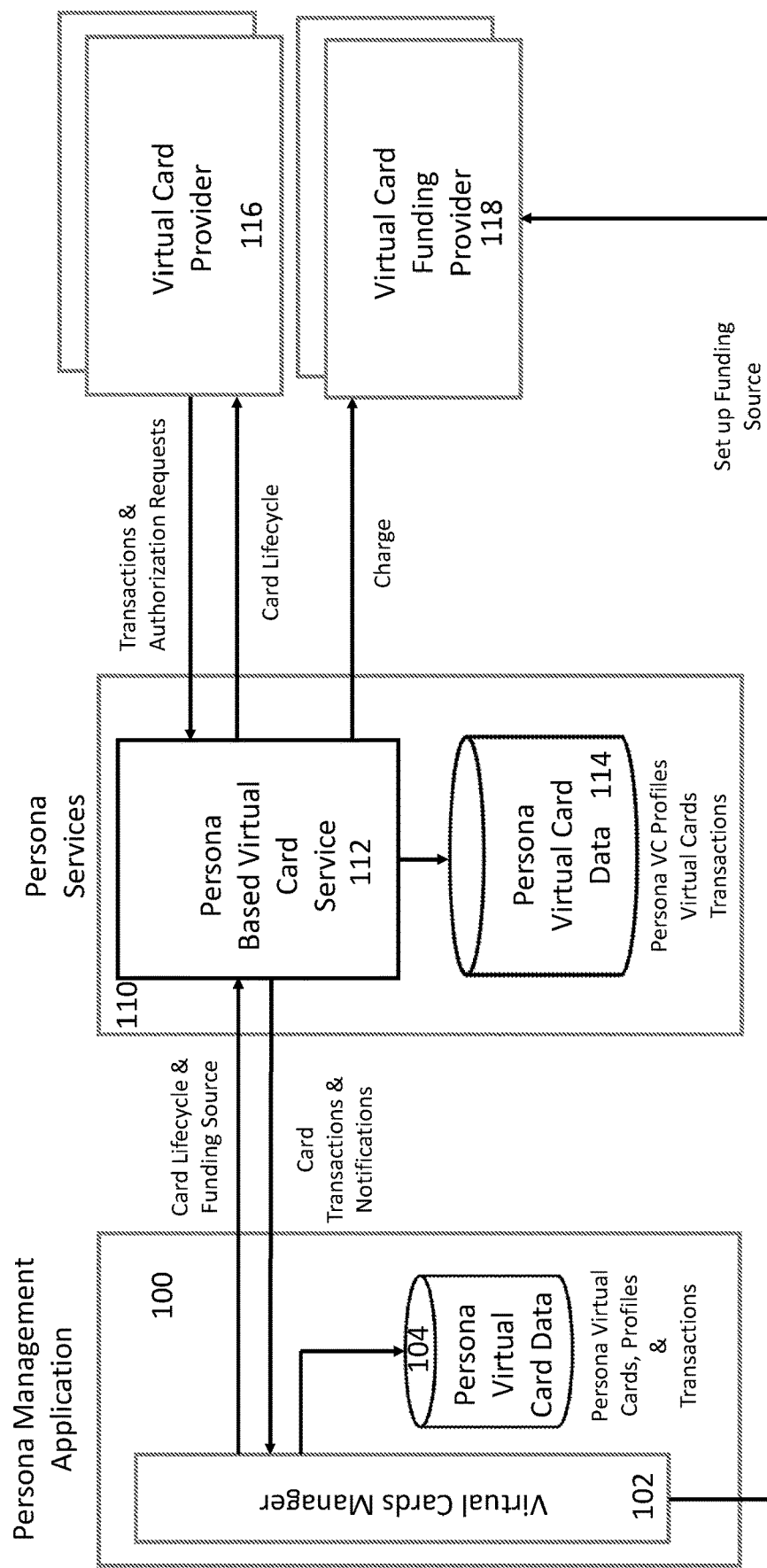
FIG. 1 is a persona based virtual card system in accordance with an embodiment of the invention.

FIG. 1 shows an overview of the Persona Based Virtual Card System. A Persona Management Application 100 is used to create Persona-Based Virtual Card Profiles and allow for the issuance and management of Virtual Cards. The Persona Management Application has a much broader role than just managing Virtual Cards in that it also manages a wide range of data and activities, such as: persona based calling, email, browsing, messaging etc. However, this disclosure will focus mainly on the persona based virtual cards management processes and systems. A Persona Management Application may be embodied as a desktop, mobile or similar application. MySudo™ from Anonyome Labs, Salt Lake City, Utah, is one such application.

The Persona Management Application 100 has a Virtual Cards Manager 102. The purpose of the Virtual Cards Manager 102 is to allow Persona Virtual Card Profiles to be established, to request issuance and cancellation of virtual cards, and to manage the virtual card notifications and transactions. Each Persona Virtual Card Profile may have zero or more Virtual Cards that it can use for a wide variety of customizable purposes. Accompanying the Virtual Cards Manager 102 is Persona Virtual Cards Data storage 104. It is the local storage where the Persona Virtual Card Profiles and where virtual card data and transactions are stored.

The Persona Management Application 100 communicates with a Persona Services platform 110. This platform provides the services to the Persona Management Application 100 and provides a virtualization layer/proxy to insulate the Persona Management Application 100 from the third-party services. In one embodiment, the Persona Services platform 110 is a cloud based service (e.g., running in Amazon Web Service (AWS), Azure, Google Cloud, etc.) that provides services to the Persona Application 100. In another embodiment, the Persona Services platform 110 operates on the user's local computing device or another of the user's computing devices. The Persona Services platform 110 can provide a wide range of persona-based services, such as persona-based calling, SMS/MMS, email, messaging, web browsing, internet-based interactions, etc. In this disclosure, the focus is on virtual cards and the Persona Services platform 110 providing the Persona Based Virtual Card Service 112 and associated Persona Virtual Card Data storage 114.

There are different types of third-party services that can be used in support of Virtual Cards. One is the Virtual Cards Provider 116 that issues Virtual Cards using a Persona Virtual Card Profile passed to it. In addition, a Virtual Card Funding Provider 118 is configured by the user to provide funding for the virtual cards. The system supports multiple Virtual Card Providers (issuers of cards or other payment types) 116 and Virtual Card Funding Providers (e.g., bank account, credit card, cryptocurrency, etc.) 118, configurable for each Persona Virtual Card Profile.

One virtual card model is a proxy model where any purchases against the virtual card are immediately placed against the funding source. Another embodiment is the prepaid card model, where a virtual card is purchased to a specific value, and holds that value until it is spent. The system supports either type of model, both of which are referred to as virtual credit cards or virtual cards.

A real person creates different personas or digital identities for such things as work, home, travel, events, shopping, donations and dating. Each Persona has its own Persona Virtual Card Profile (a Persona can have zero or more profiles), that describe the desired configuration for any virtual cards created under that profile. When virtual cards are then requested by a Persona, they are created to match the profile of that Persona.

A key privacy concept is the use of digital personas for compartmentalization or grouping of service interactions. Rather than a user performing all service interactions with the one identity, the user will create multiple digital personas and use them for different purposes. Each persona has its own unique identity attributes that may include name, handle, phone number, email address, virtual private network (VPN) configuration, browser state, log-in credentials, and shipping address. Each persona should be used for a limited and specific purpose. Consequently, any tracking done on an individual user persona would not form a complete picture of the user's activity, since they will operate using various personas. The personas act as a personal privacy proxy, not allowing people and online services direct access to the user's personal identity.

Personas can help the user in a number of ways. Not only do personas assist in protecting the privacy of the user, but they also assist in the management of the user's online and offline interactions. Using separate activity-based personas will naturally compartmentalize the user's various interactions by grouping them in a manageable way, such as: work persona, selling persona, web searching persona, shopping persona, etc. For example, the user may have a work-related social account (e.g., Twitter®), and a personal related social account on the same platform. Separating the social account information and communication by personas (e.g., work and social personas), helps the user to manage these two interactions and to keep them completely separate. Another advantage of the digital personas is that they can be temporary, such as a persona can be established for a particular relationship or transaction and can then be deleted when it is no longer needed.

Figure 2:
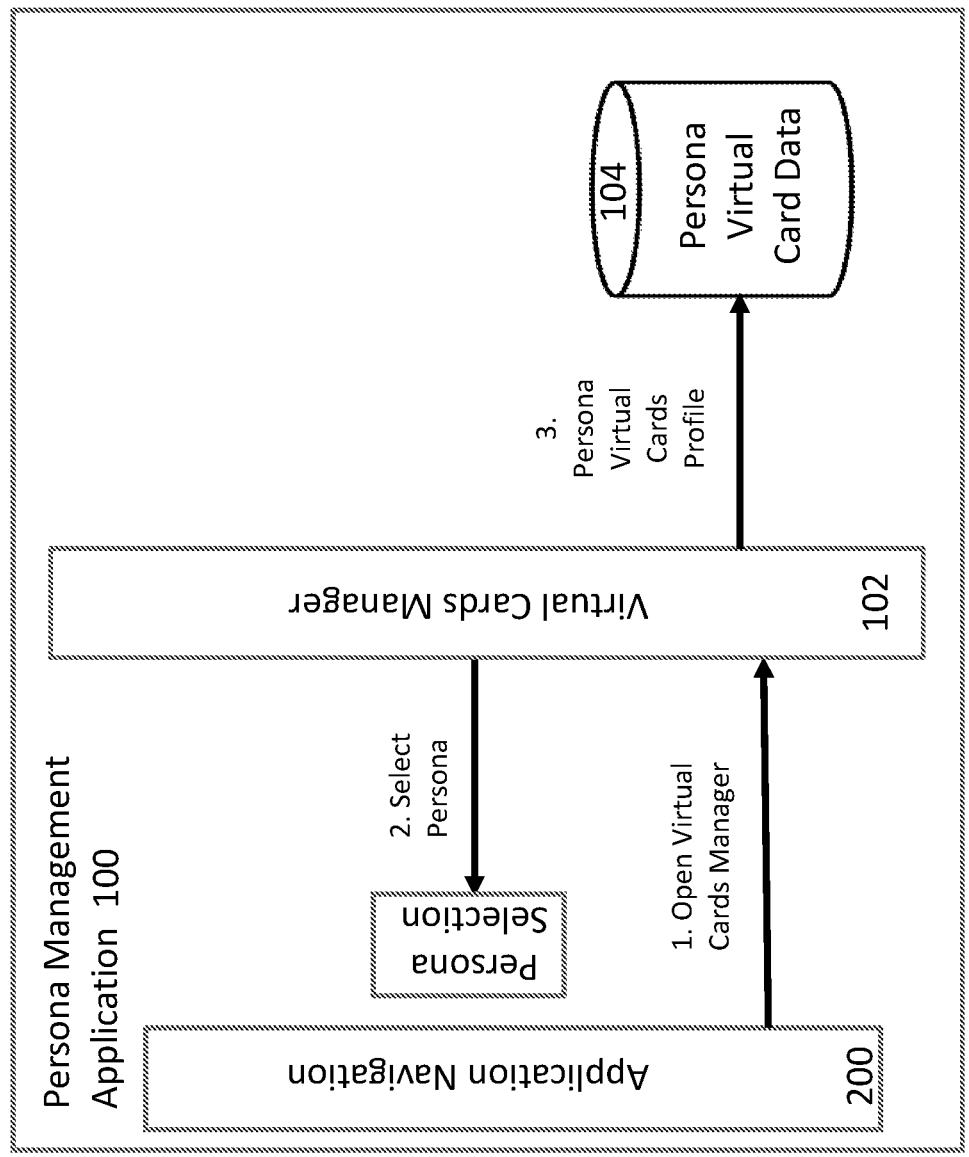
FIG. 2 illustrates processing to configure a persona virtual card profile.

FIG. 2 shows how the Persona Virtual Cards Profile is configured. An application navigation interface 200 is used to access the Virtual Cards Manager 102. The user selects the persona that they want to work with, and then configures the Virtual Card Profile settings. This data is stored locally in the Persona Virtual Card Data 104. Virtual Card Profile settings may include card brand, expiry date, billing address, geographical limits, transaction limit, transaction delivery, notifications, funding provider, merchant codes, time based restrictions, daily spend limit, card spending allocation and shipping address.

Every persona that uses virtual cards will need to have a Virtual Card Funding Provider established for that persona. A Virtual Card Funding Provider provides the funds to cover the cost of the virtual card in advance (prepaid card model) or funds each individual purchase on the virtual card (proxy card model). Suitable Funding Providers are typically provided by banks: credit card, debit card, bank account, crypto currency account, or similar mechanism.

Figure 3:
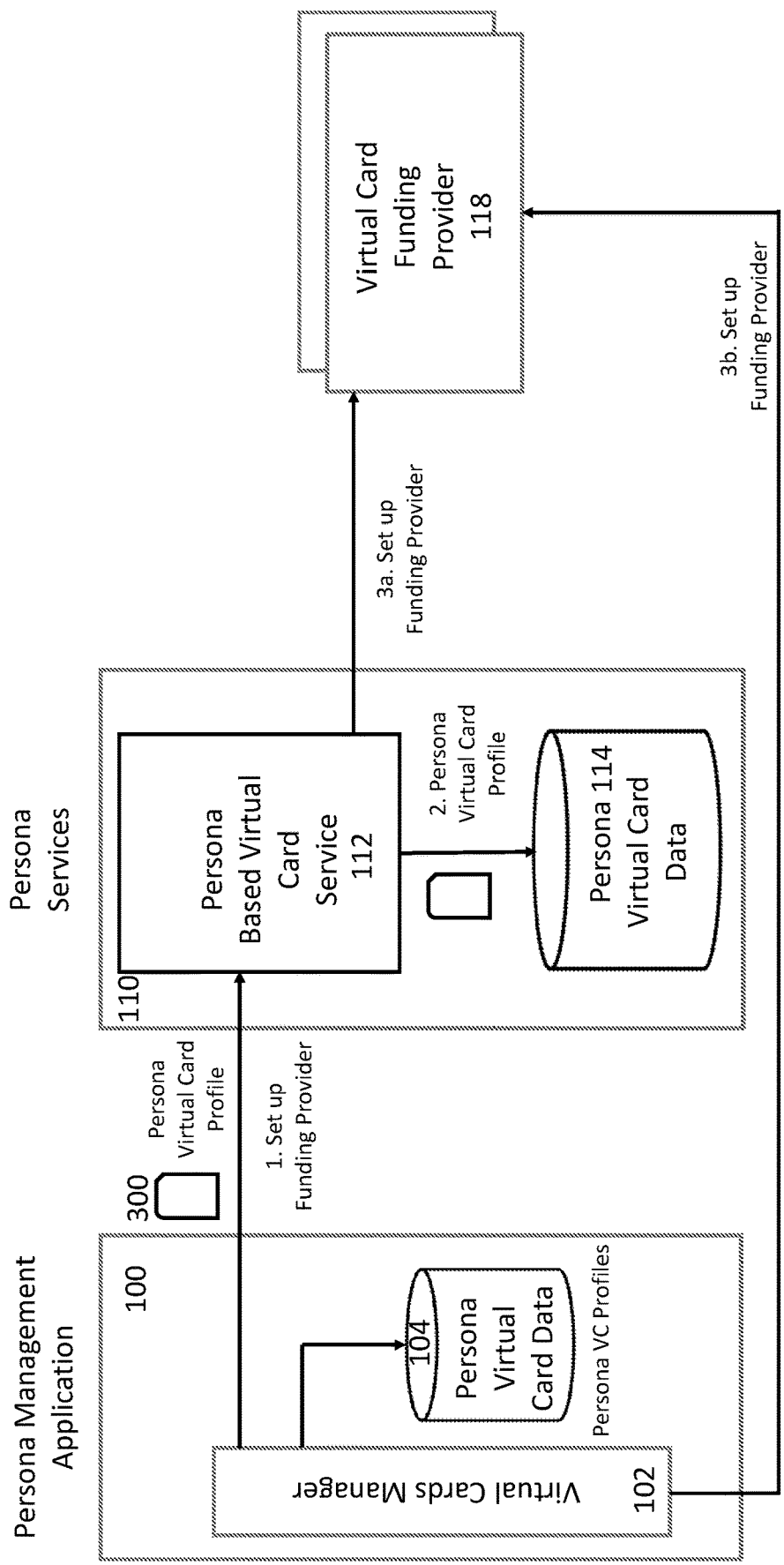
FIG. 3 illustrates setting up a virtual card funding provider for a persona.

FIG. 3 shows the steps to set up the Virtual Card Funding Provider. During the configuration of the Persona Virtual Card Profile the Funding Provider is established. The Persona Management Application 100 sends the Persona Virtual Card Profile information (containing the desired Funding Provider) 300 to the Persona Services platform 110. The Persona Services platform 110 stores a copy of the Persona Virtual Card Profile as persona virtual card data 114. There are two steps that may be required to configure the chosen Funding Provider. The Persona Based Virtual Card service 112 communicates with the Funding Provider 118 to set it up as a funding source for the Persona's virtual cards. In the case of a bank account it may be communicating the requirement to the bank that the user wishes to withdraw funds from a specific bank account. In the case of the credit card it may need to perform a test transaction. The user (via their Persona Management Application 100) may also need to communicate directly with the Funding Provider, e.g. for authentication and confirmation of Funding Provider services. This may include signing paper documents or electronically authorizing the connection.

Figure 4:
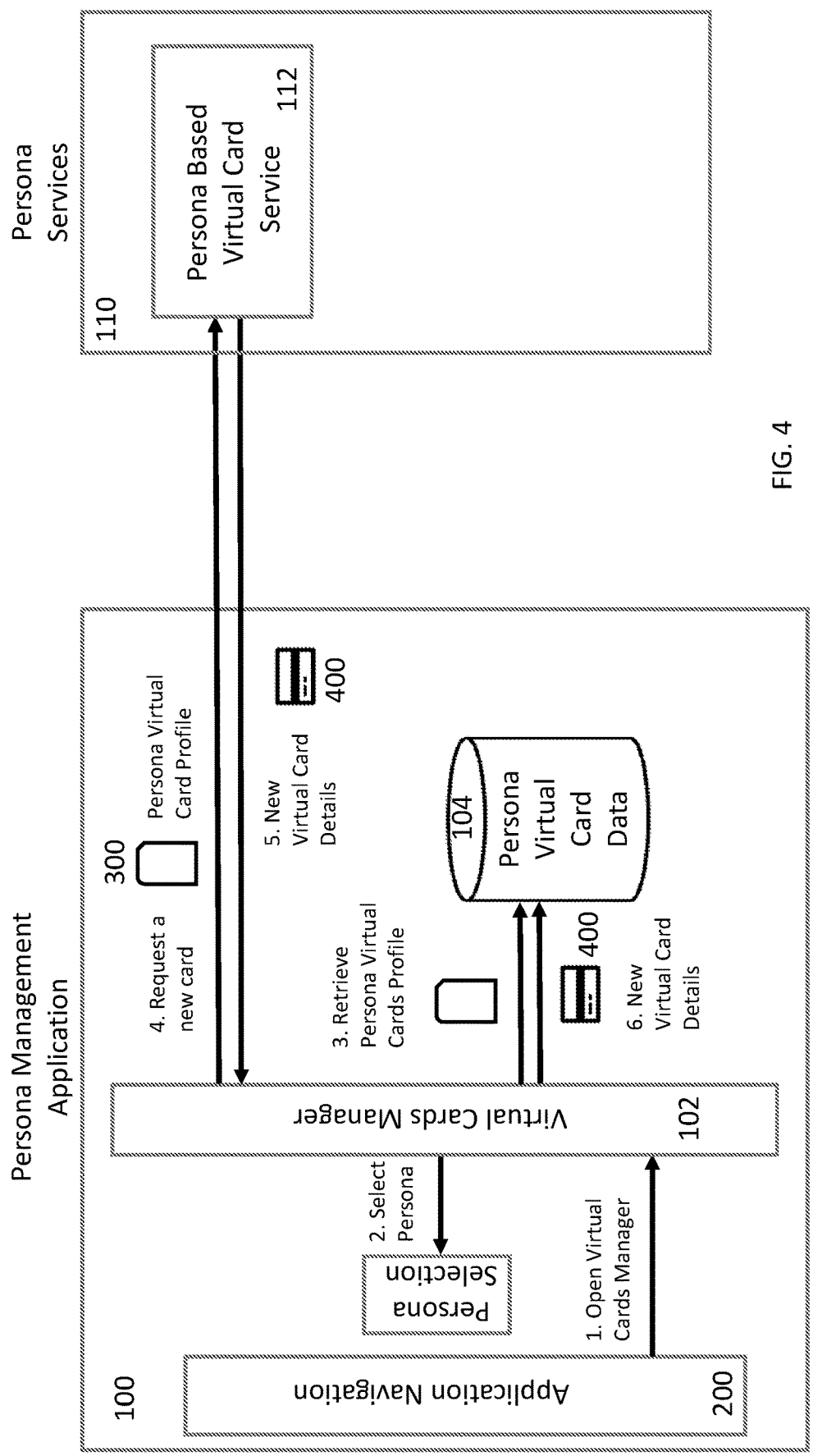
FIG. 4 illustrates a persona management application requesting a virtual card from a persona services platform.

Once a Persona's Virtual Card Profile has been created, and the Virtual Card Funding Provider established, the user can then request a virtual card for that profile. FIG. 4 shows the steps for the Persona Management Application 100 to request a virtual card from the Persona Services platform 110. The user opens the Persona Management Application's Virtual Cards Manager 102. The user selects the active Persona. The Virtual Cards Manager 102 retrieves the Persona's Virtual Cards Profile from the local storage Persona Virtual Card Data 104. The Virtual Cards Manager 102 requests a new virtual card from the Persona Based Virtual Card Service platform 110. A new virtual card 400 is returned from the Persona Based Virtual Card Service platform 110 matching the profile's parameters. The new virtual card 400 is stored in the local storage Persona Virtual Card Data 104.

Figure 5:
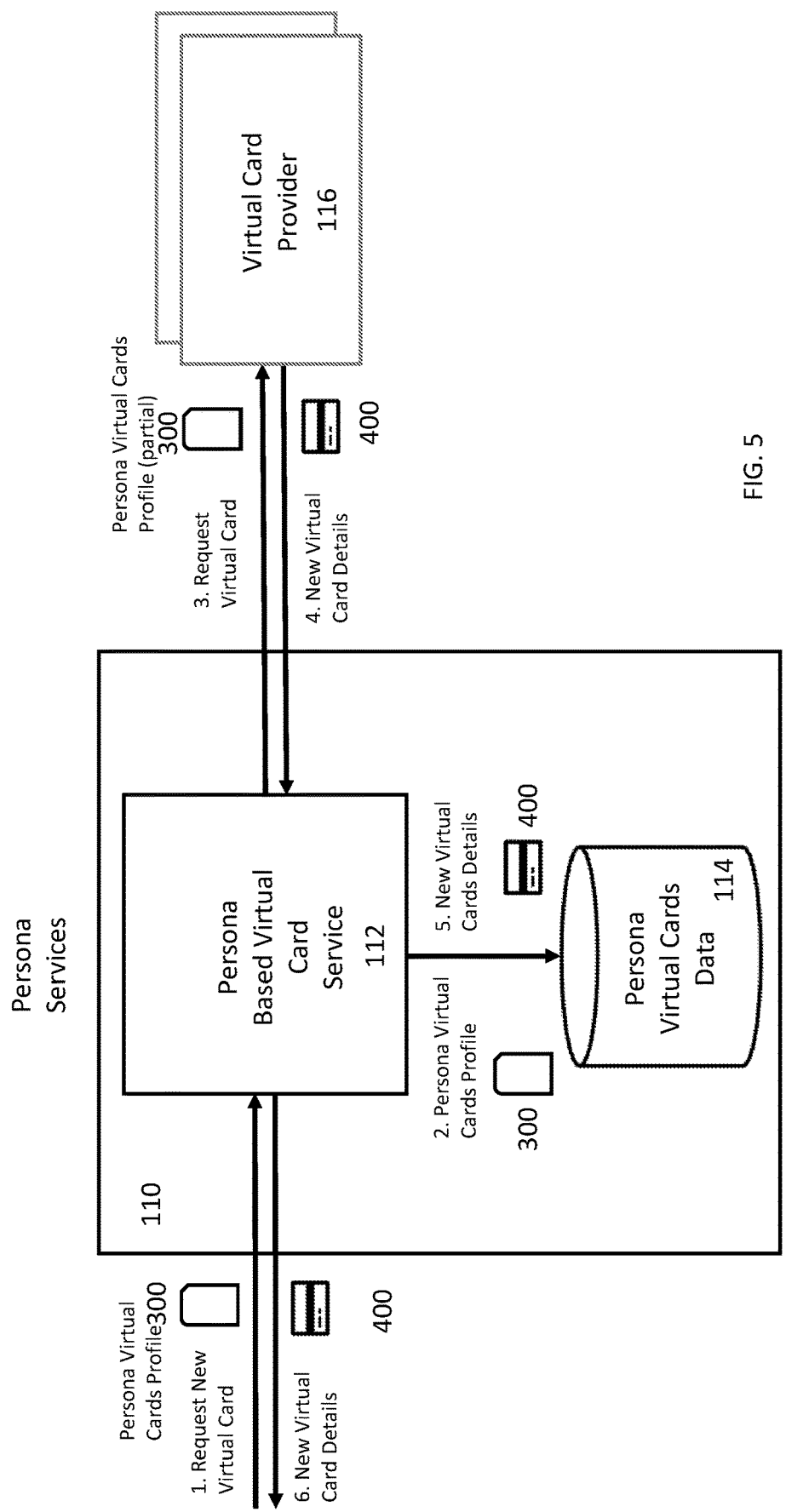
FIG. 5 illustrates a persona services platform interacting with a virtual card provider.

FIG. 5 adds to FIG. 4 by showing the interaction of the Persona Services platform 110 in more detail. The Persona Based Virtual Card Service 112 receives a request from the Persona Management Application 100 for a new virtual card. As part of that request is the Persona's Virtual Card Profile 300. The Persona Based Virtual Card Service 112 then stores the Persona's Virtual Card Profile in its Persona Virtual Cards Data (cloud storage) 114. Based on the data stored in the Persona Virtual Card Profile, e.g. brand of card required, the Persona Based Virtual Card Service 112 selects the third party Virtual Card Provider 116 of choice, passing that third party some subset of the Persona's Virtual Card Profile 300 so that it knows the parameters to use to create the new virtual card. The Third Party Virtual Card Provider 116 returns the new virtual card 400 to the Persona Based Virtual Card Service 112. The Persona Based Virtual Card Service 112 stores the new virtual card information 400 in the Persona Virtual Cards Data 114. The Persona Based Virtual Card Service 112 returns the new virtual card 400 to the Persona Application.

Figure 6:
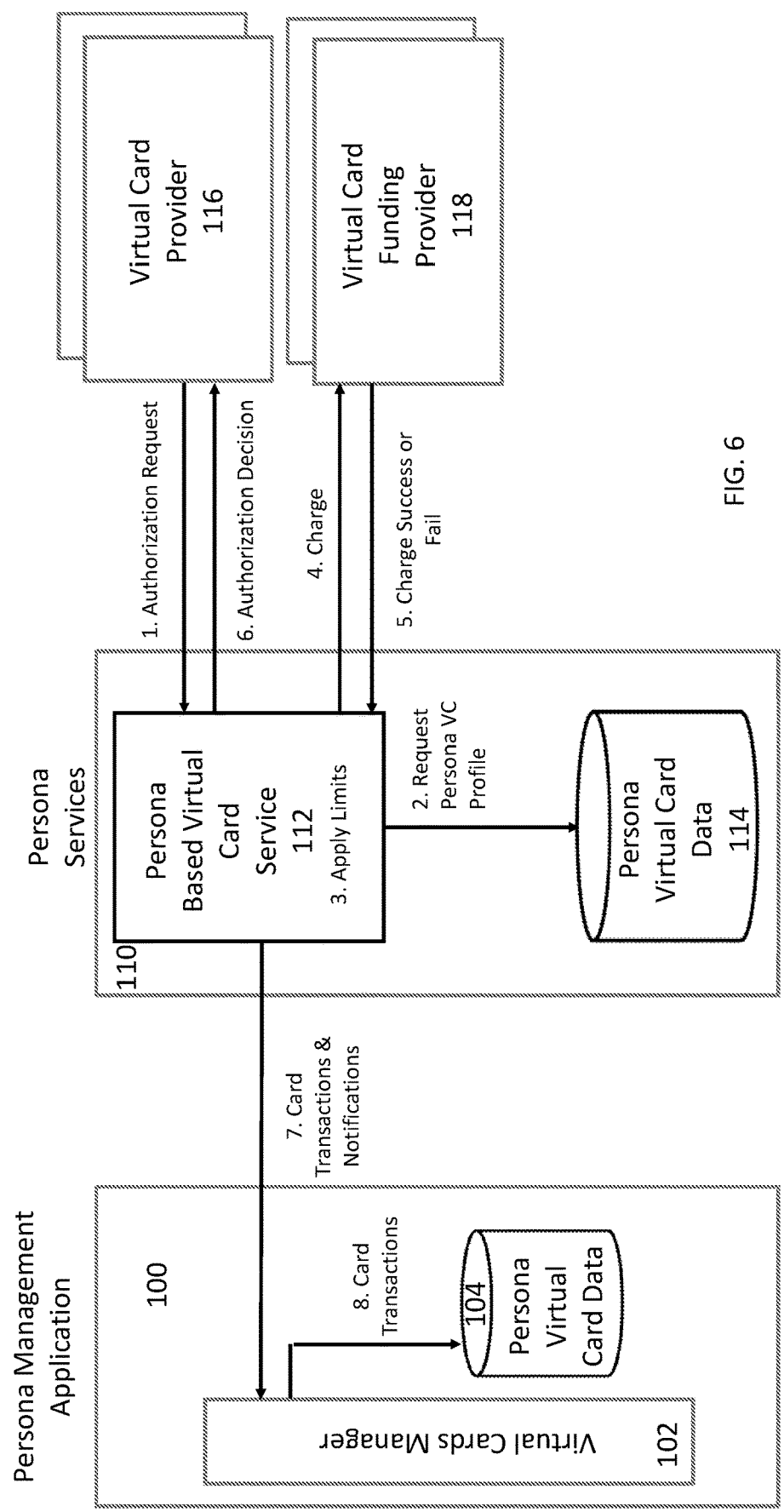
FIG. 6 illustrates a persona services platform interacting with a virtual card provider, a virtual card funding provider and a persona management application.

FIG. 6 illustrates how a user performs a purchase using a persona's virtual card and a proxy virtual card model. A persona's Virtual Card Provider 116 sends an authorization request to the Persona Based Virtual Card Service 112. The Persona's Virtual Card Service 112 accesses the Personal Virtual Card Profile from the Persona Virtual Card Data (local cloud storage) 114. The Persona Virtual Card Service 112 checks the limits on the virtual card profile to ensure the authorization request falls within those limits, some examples are: the transaction limit of the virtual card is not exceeded, the merchant code is acceptable, the daily spend limit of the virtual card is not exceeded. Assuming the checks are acceptable, the Persona Based Virtual Card Service 112 charges the Virtual Card Funding Provider 118 for the amount of the purchase. The Virtual Card Funding Provider 118 returns success or failure for the charge. Not all Funding Providers are able to provide indication of success or failure in real time. Some Funding Providers will instead make a risk based decision on whether to authorize the virtual card transaction, deferring charging until a later time (e.g. withdrawal from a bank account). The Persona Based Virtual Card Service 112 gives the authorization decision to the Virtual Card Provider 116. The Persona Based Virtual Card Service 112 notifies the user. A push notification is sent to the Persona Management Application 100 containing the authorization decision so that the user can see it in real time. A transaction is sent to Persona Management Application 100 containing the authorization decision result. The Persona Management Application's Virtual Cards Manager 102 writes the transaction to the Persona Virtual Card data storage 104.

In some scenarios, it may be desirable for one Persona to create and configure a Virtual Card and then transfer it to another Persona. Some scenarios where this process may be desirable include: giving a gift card, a parent providing a payment card for a child, or even transferring an established Virtual Card from an employee being promoted to another employee assuming the vacated position.

As described above, a Virtual Card is representative of the specified connection of three main elements: Virtual Card Provider 116, Virtual Card Funding Provider 118, and the Persona (via the Persona Services). It is possible to replace any of these three elements with another Persona or provider in order to change the ownership or operation of the Virtual Card.

Figure 7:
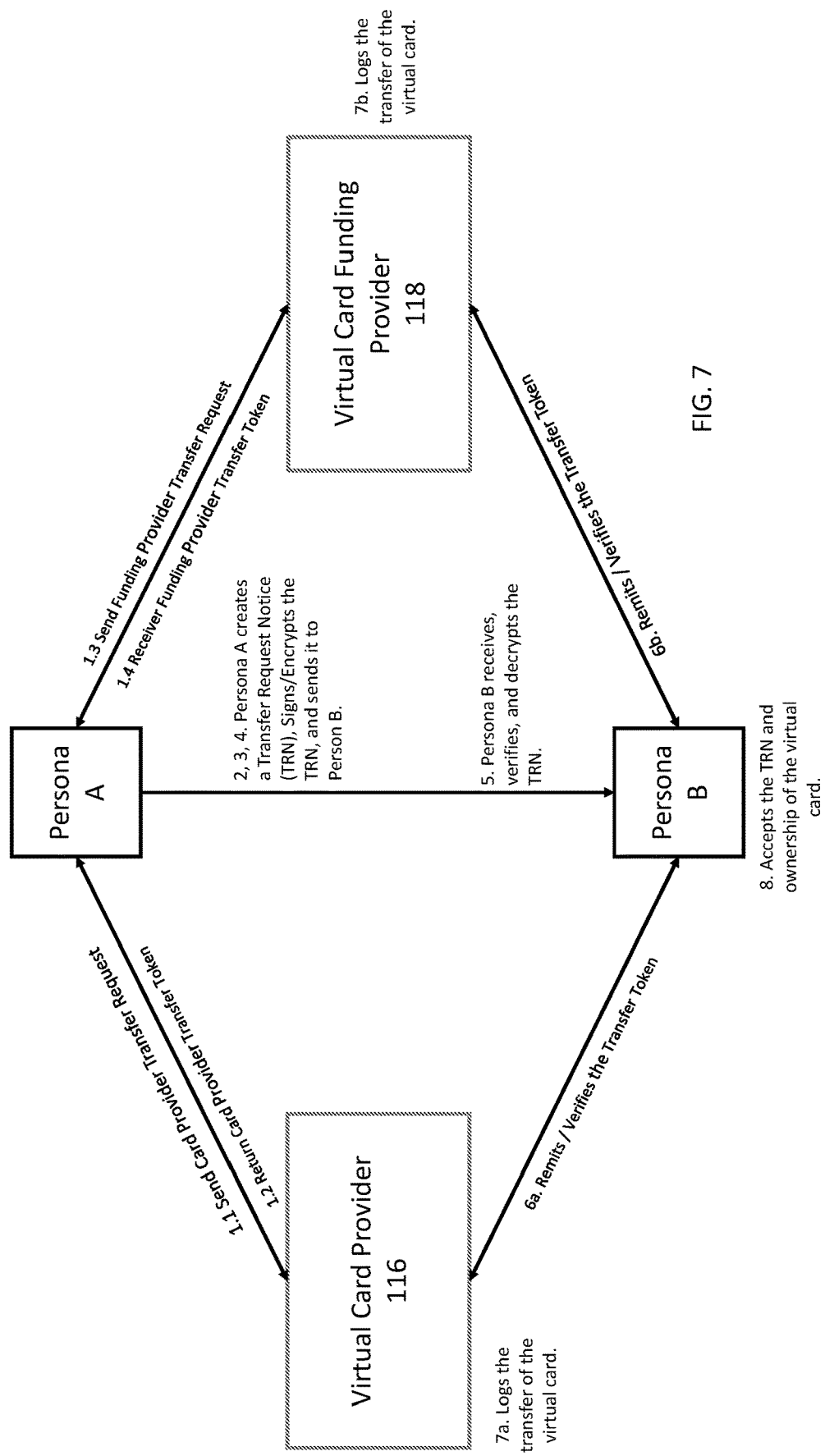
FIG. 7 illustrates transferring a virtual card between two users.

In one embodiment, it is desired to change the Persona that owns an existing Virtual Card that has been created using the processes above. FIG. 7 illustrates Persona A transferring ownership of a Virtual Card to Persona B. Persona A optionally notifies the Virtual Card Provider 116 and the Virtual Card Funding Provider 118 of its intent to transfer the Virtual Card to Persona B. The requests may be logged. In some embodiments, the providers may issue Transfer Tokens to Persona A that it will convey to Persona B that will redeem them later as part of an authentication process. Persona A prepares a Transfer Request Notice (TRN) that specifies information needed to identify the Virtual Card, identifying information specifying the sender and receiver. In another embodiment, the Transfer Tokens are also specified in the TRN. Persona A cryptographically signs and encrypts the TRN. Persona A sends the TRN to Persona B. Persona B decrypts and authenticates the TRN. Persona B verifies the TRN with the Virtual Card Provider 116 and or the Virtual Card Funding Provider 118 that Persona A notified them of its intent to transfer the Virtual Card to Persona B. In another embodiment, Persona B remits the Transfer Tokens provided in the TRN. In another embodiment, the Virtual Card Provider 116 and Virtual Card Funding Provider 118 make a note of the change of Virtual Card ownership from Persona A to Persona B. Persona B (optionally) accepts the TRN and takes ownership of the transferred card. In some embodiments, this can include cryptographic keys and other identifying elements.

Using the process described above, one Persona can transfer ownership of a Virtual card to another Persona. In another embodiment, Know Your Customer (KYC) or other required provisions will have been met for both the sending and receiving parties.

Figure 8:
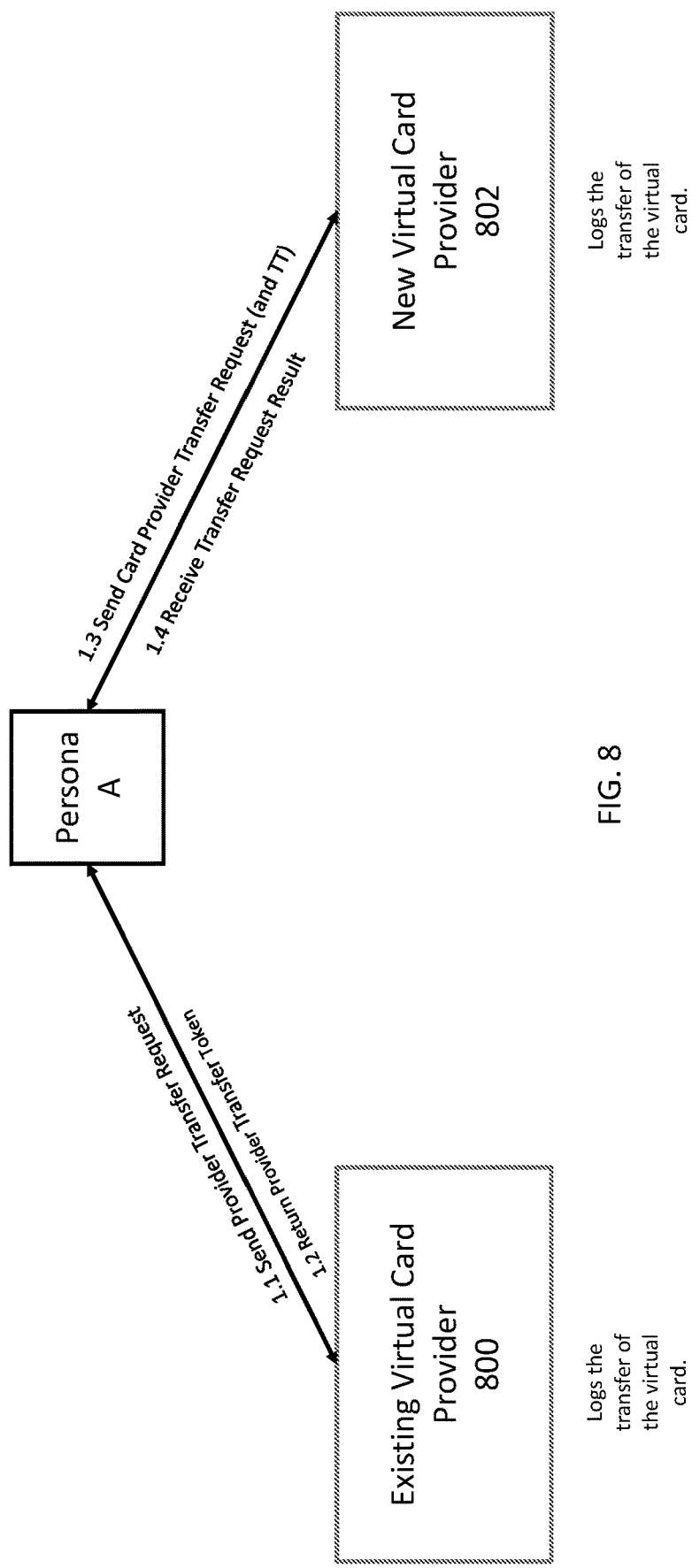
FIG. 8 illustrates transferring a virtual card from an existing virtual card provider to a new virtual card provider.

In another embodiment, a process similar to the previously described process can be used to designate a new Virtual Card Provider. FIG. 8 illustrates Persona A transferring from an existing virtual card provider 800 to a new virtual card provider 802. Persona A sends a provider transfer request. The existing virtual card provider 800 returns a provider transfer token. Persona A then sends a transfer request and transfer token to new virtual card provider 802, which acknowledges the transfer request.

Figure 9:
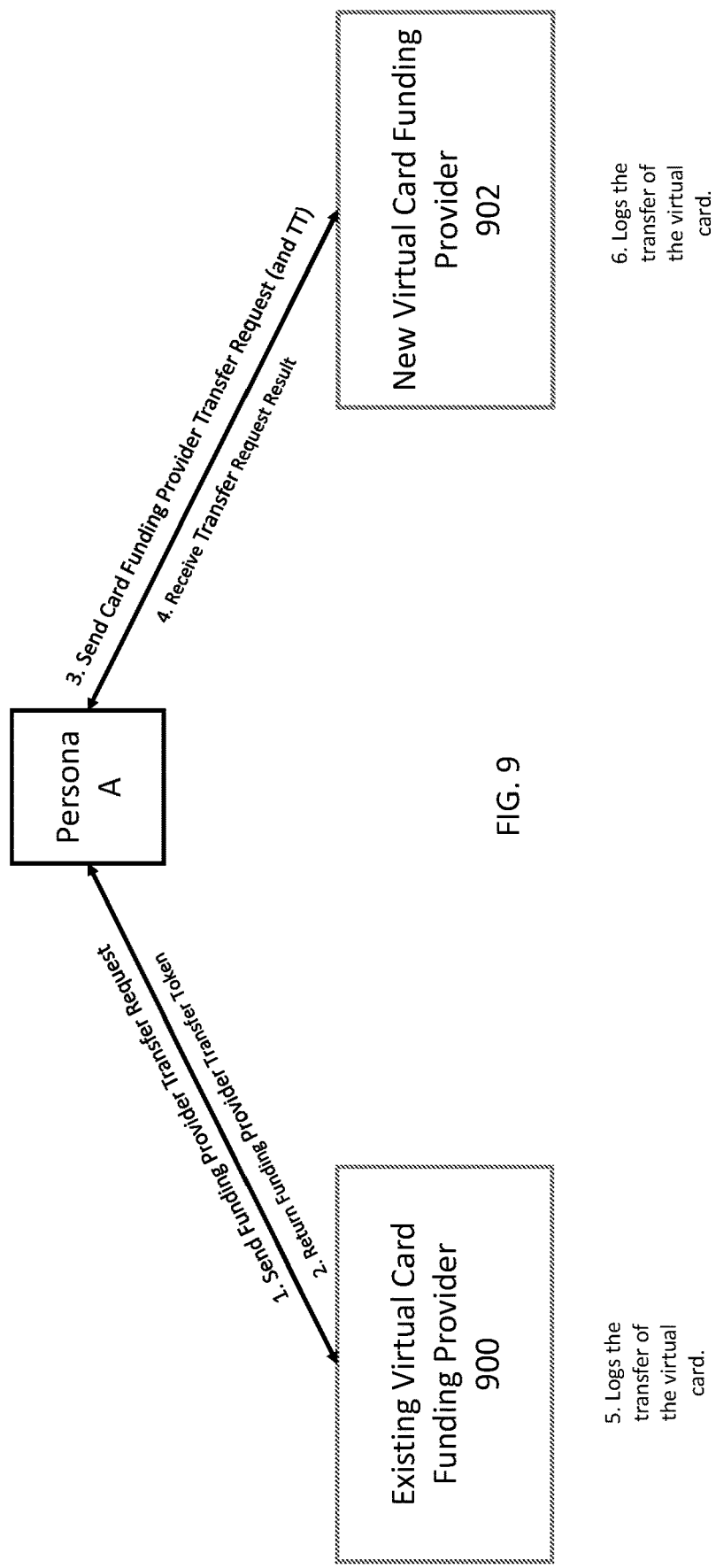
FIG. 9 illustrates transferring a virtual card from an existing virtual funding card provider to a new virtual card funding provider.

FIG. 9 illustrates Persona A transferring from an existing virtual card funding provider 900 to a new virtual card funding provider 902. In particular, persona A sends a funding provider transfer request. The existing virtual card funding provider 900 returns a transfer token. Persona A sends a funding provider transfer request and transfer token to the new virtual card funding provider 902, which acknowledges the transfer request.

Figure 10:
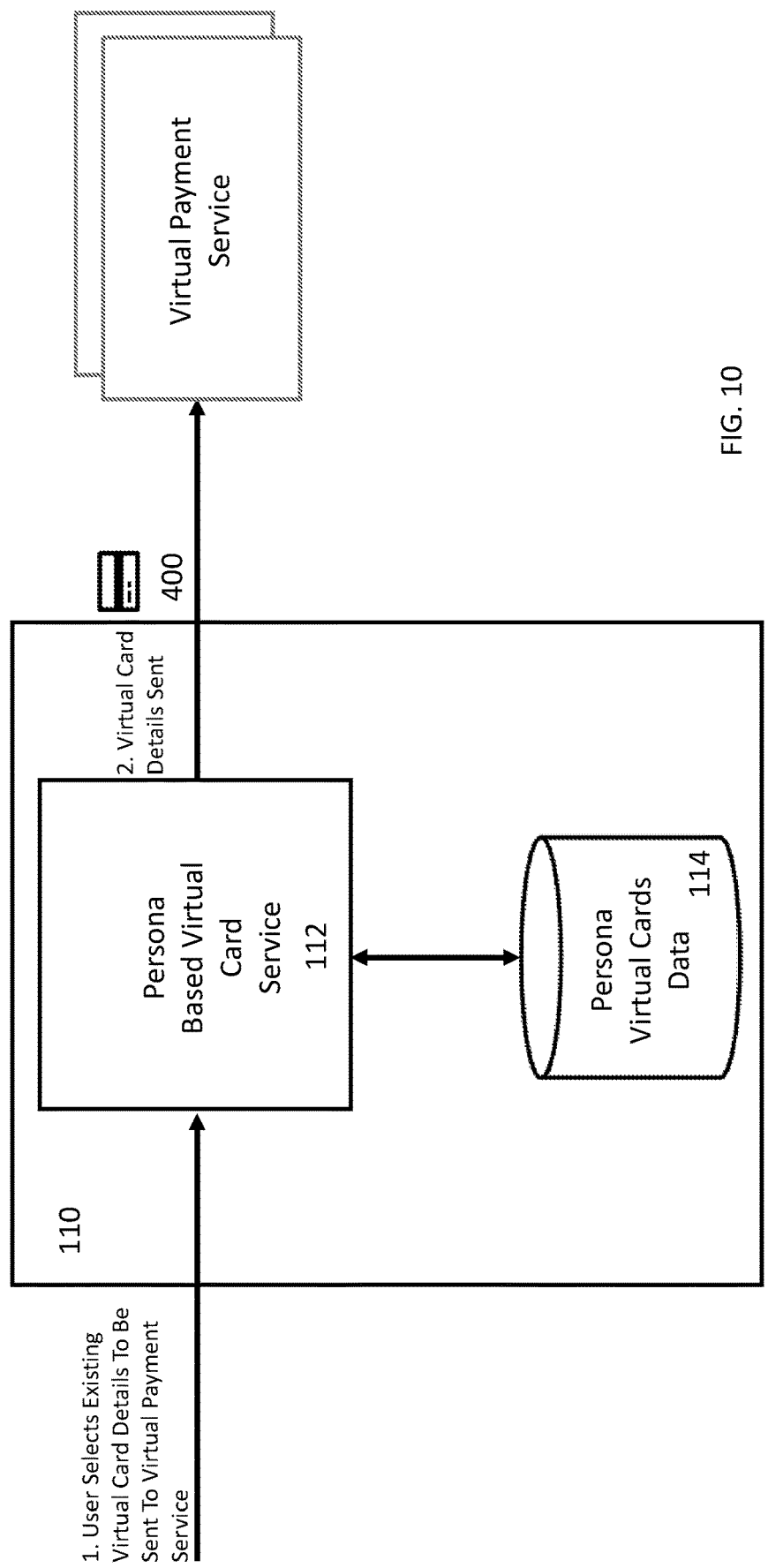
FIG. 10 illustrates transferring a virtual card to a virtual payment service.

FIG. 10 illustrates a user or persona selecting a specific virtual card from an existing set of persona virtual cards 114 and sending the virtual card details 400 to a new virtual payment service (e.g., PayPal®, Apple Pay®, Android Pay®, Amazon®, etc.). A virtual payment service may store the virtual card details 400 in order for the user or persona to subsequently invoke the payment service process implemented by the virtual payment service according to its specified system and design. In another embodiment, the user or persona may request the virtual card details from the Persona Services platform 110 and hold them outside of the Persona Management Application 100. The user or persona may subsequently send the virtual card details to a virtual payment service to be stored for subsequent payment requests.

Figure 11:
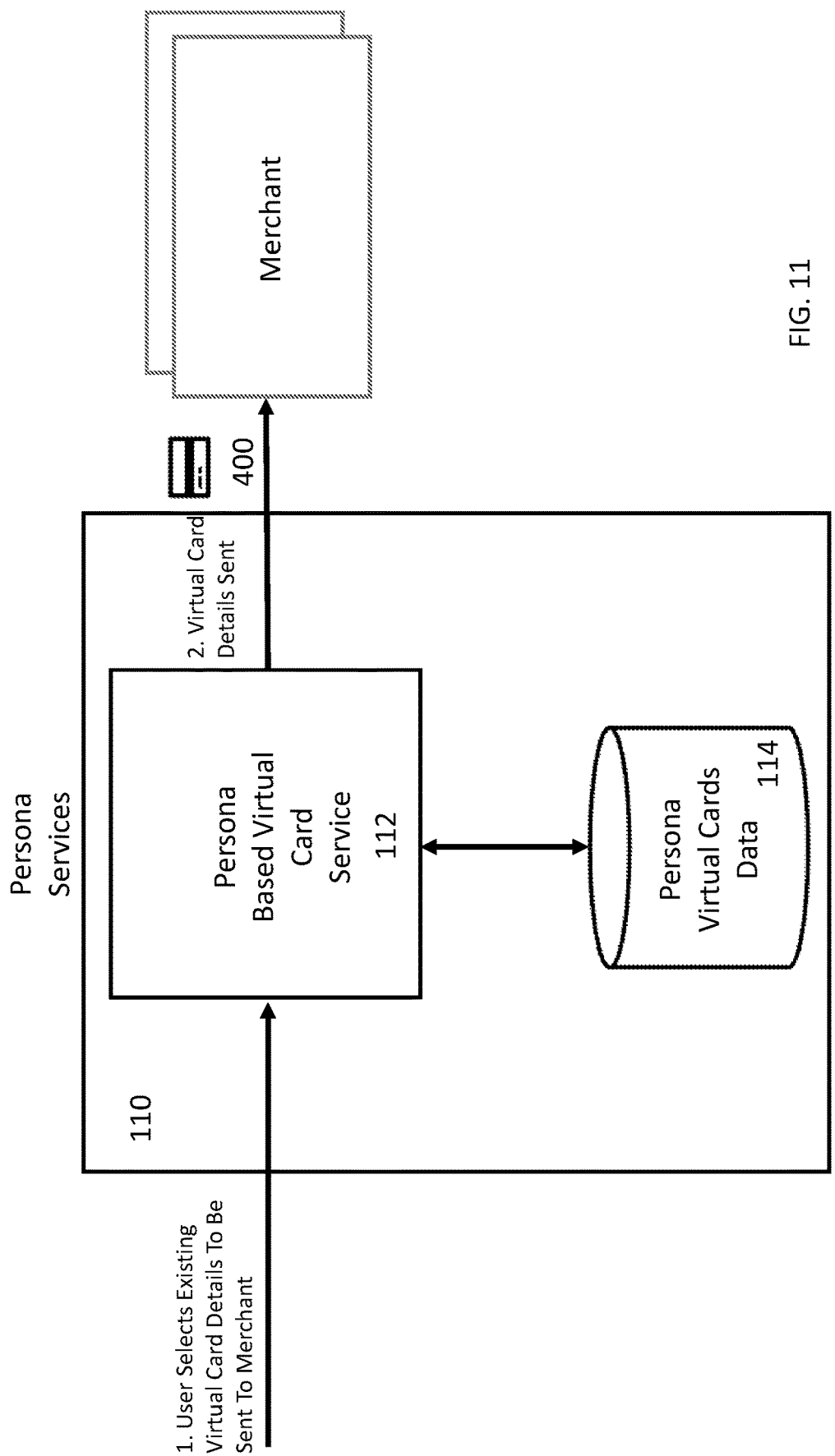
FIG. 11 illustrates transferring a virtual card to a merchant.

FIG. 11 illustrates a user or persona selecting a specific virtual card from an existing set of persona virtual cards 114 and sending the virtual card details 400 to a merchant (e.g., Walmart®, Netflix®, Amazon®, etc.) as part of a payment transaction. In one embodiment, a merchant may process the virtual card details to receive payment and discard them once payment has been received or optionally once the return, transaction dispute, or other required regulatory dates have elapsed. In another embodiment, the merchant may store the virtual card details as part of creating a customer account to enable the persona or customer to simplify the process of making subsequent purchases. In another embodiment, the user or persona may request the virtual card details from the Persona Services platform 110 and hold them outside of the Persona Management application 100. The user or persona may subsequently send the virtual card details to a merchant as part of the payment or account creation processes.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by processors, the processors by executing the instructions of the non-transitory computer readable storage medium, perform the operations of:

storing digital identities in a persona management application executing on a first machine (100) operated by a first user, wherein each digital identity has identity attributes different than identity attributes associated with the first user who is a real individual utilizing the digital identity, and wherein each digital identity executes code (102, 104) establishing compartmentalized network activity for the first user, operating a persona services platform on a second machine (110) in network communication with the first machine (100);

executing, via the persona services platform, interactions between the digital identities and a virtual card provider that secures virtual cards of the digital identities, each virtual card having a digital representation of a virtual card number, a virtual card expiry date and a virtual card verification code, the virtual card provider operating a third machine (116) in network communication with the second machine (110);

brokering, by the persona services platform, interactions between the digital identities and the persona management application, including delivering the virtual cards of the digital identities to the persona management application;

operating the persona management application such that each digital identity and associated attribute that performs the compartmentalized network activity uses a designated virtual card with compartmentalization of virtual card configuration, transactions and notifications; and executing an exchange of a virtual card from the first user to a second user, where the exchange includes the first user notifying the virtual card provider and a virtual card funding provider of the exchange, the virtual card funding provider operating a fourth machine (118) in network communication with the first machine (100) and the third machine (116).

2. The non-transitory computer readable storage medium of claim 1 further comprising instructions (112, 114) executed by the persona services platform copying a virtual card from a persona virtual card profile to a virtual payment service.

3. The non-transitory computer readable storage medium of claim 1 further comprising instructions (112, 114) executed by the persona services platform copying a virtual card from a persona virtual card profile to a merchant (FIG. 11) remitting payment.

4. The non-transitory computer readable storage medium of claim 1 further comprising code (116, 118, FIG. 7) transferring tokens granted to the first user that are supplied to the second user.

\* \* \* \* \*